(No Model.)

C. L. BASTIAN.
HOSE COUPLING.

No. 456,756. Patented July 28, 1891.

Witnesses
W. Rossiter
J. B. Carpenter

Inventor
Charles L. Bastian
By Bruce Fishel
Attys.

UNITED STATES PATENT OFFICE.

CHARLES L. BASTIAN, OF CHICAGO, ILLINOIS.

HOSE-COUPLING.

SPECIFICATION forming part of Letters Patent No. 456,756, dated July 28, 1891.

Application filed May 27, 1889. Serial No. 312,253. (No model.)

*To all whom it may concern:*

Be it known that I, CHARLES L. BASTIAN, a citizen of the United States, residing at Chicago, in the county of Cook and State of Illinois, have invented certain new and useful Improvements in Hose-Couplings, of which the following is hereby declared to be a full, clear, and exact description, sufficient to enable others skilled in the art to which such invention appertains to make and use the same.

The invention relates to hose-couplings or like tubular sections having a swivel-joint connection between the members thereof; and it consists of certain improvements in structure, as hereinafter detailed, and more particularly pointed out in the claim at the conclusion of the description, whereby the tubular members are securely joined together in a simple and efficient manner at the same time that they are free to swivel upon each other, as necessary.

Figure 1:
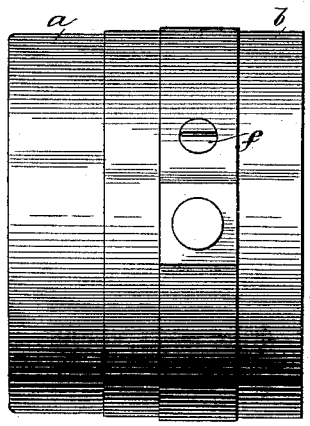
Figure 2:
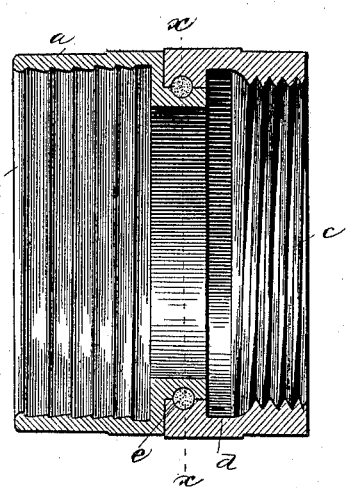
Figure 3:
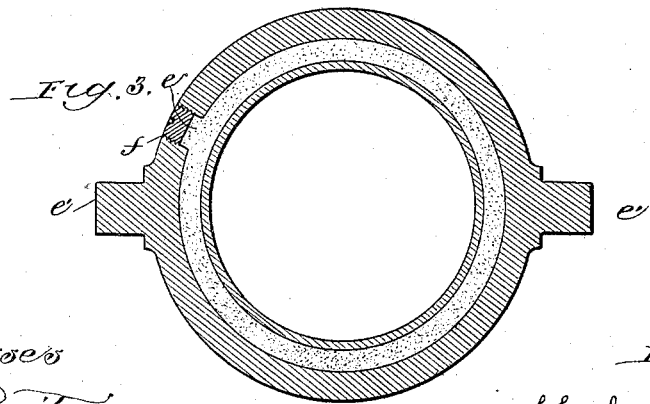

Referring to the accompanying drawings, forming part of this description, and in which like letters of reference denote like parts of structure throughout, Figure 1 is a view in side elevation, Fig. 2 a longitudinal central section, and Fig. 3 a transverse section on line *x x* of Fig. 2, of a hose-coupling constructed in accordance with the invention.

The tubular members or sections *a b*, which together constitute the coupling, are made, as usual, with the outer terminals *c* thereof threaded to receive the ends of the hose to which the coupling-sections are fixed. One of the members *b* has the sunken seat *d* to receive the rubber washer or packing, and carries the spanner-pin *e*, as in ordinary practice. The contacting faces of the members *a b* of the coupling are turned true and fitted to each other to form the swivel connection, as in ordinary practice. Opposite grooves in the adjacent edges of the two sections serve to receive the filling, as will presently be described, which locks the coupling members while allowing them to swivel upon each other. As thus far detailed the construction does not differ from types of hose-coupling already upon the market, and consequently forms no part of the invention.

Heretofore the locking of the swivel-joint to prevent the separation of the coupling-sections was accomplished by thrusting an annealed wire through an opening formed above one of the semi-grooves, as at *e*, Fig. 3, into the space presented by the opposite grooves of the coupling when the members thereof were set in place; or, instead of the wire-lock, a series of spherical balls were dropped through the same opening until the groove referred to had been filled therewith. In either event the contacting faces of the tubular sections of the coupling needed to be fitted with great accuracy, because, if the semi-grooves therein were in offset relation, the wire or balls of sufficient diameter would not be admitted, nor would the members of the coupling swivel freely, as desired. Under the best conditions the diameter of the wire or that of the balls must be appreciably less than that of the groove into which they were set, in order that the wire or balls might be admitted thereinto; but this difference in diameter rendered the locking of the joint shaky and tended also to make the same insecure.

My invention designs to employ a filling of Babbitt or like cast metal, which will flow into and freely expand within the grooved seat of the joint to fill the same snugly and completely, so that the members of the coupling are tightly held together and yet are free to swivel. In the practice of the invention, after the members of the coupling are true and fitted, and the grooves cut at opposite points in the contacting faces thereof, one of the members *a* is coated about its joint face with whiting, lamp-black, or other material, which will serve to part the casting of Babbitt metal or the like when the same sets in contact with the coating. A convenient plan in practice is to hold the contact-face of the coupling *a* over the flame of a lamp until the same is well covered with a coating of lamp-black.

The sections of the coupling being set together, a plug of a diameter sufficient to fill the bore of the coupling member *b* is inserted therein, preferably to the groove *d*, and a flame of gas or the like admitted through the open end of the member *a*, so as to heat the same about its surface. The plug protects the coupling-section *b* from exposure to the flame, so that the member *a* is alone heated and expanded. The result of the expansion is to cause the coupling members to be tightly held together at the swivel-joint in readiness to receive the filling of melted metal. The latter is introduced through the hole e and quickly fills the entire circuit of the groove or channel formed in the opposite faces of the coupling members. When the metal sets, it adheres tightly to the semi-groove in the section b, while the section a on cooling contracts and draws away slightly from the filling, the coating of whiting, lamp-black, or the like allowing the coupling-section to part from the filling around the entire circuit without difficulty. The locking of the joint is thus completed, while the coupling members are free to turn or swivel upon each other in the usual way. By permitting the sprue-hole to remain filled in part with the metal used in casting the filling is held more securely in its grooved seat, although where Babbitt metal is employed this adheres sufficiently to the brass of the coupling member b to be stoutly retained. A plug f, tapped into the sprue-hole, serves for finish and protection of the filling. Instead of Babbitt metal, other composite metal melting at a temperature below that of the metal of the coupling may be employed, and in some instances it may be found that the filling will part from one section of the coupling, and contraction of the latter will occur without the use of the preliminary coating, as hereinbefore described, although the employment of the latter is ordinarily preferred. The locking of the swivel-joint by the foregoing method is secured, even though the members of the coupling may not be accurately fitted, and in consequence the semi-grooves thereof be more or less in offset relation. Obviously the position and shape of the groove may be varied from what is shown by the drawings, and, again, the same sort of lock-filling be employed for other purposes than to retain the swivel-joints of hose-couplings, without departing from the spirit of my invention, which latter, in consequence, is not limited to the precise details or particular purpose heretofore assigned.

Having thus described this invention, what I claim as new, and desire to secure by Letters Patent, is—

A hose-coupling having grooves in opposite faces of the members thereof at the swivel-joint, and a cast-metal filling adherent to one of said grooves, substantially as described.

CHARLES L. BASTIAN.

Witnesses:
JAMES H. PEIRCE,
GEO. P. FISHER, Jr.